United States Patent
Ojima et al.

(10) Patent No.: US 7,711,218 B2
(45) Date of Patent: May 4, 2010

(54) OPTICAL RECEPTION APPARATUS AND CONTROLLING METHOD THEREOF

(75) Inventors: Hisayuki Ojima, Kawasaki (JP); Katsumi Fukumitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 12/149,381

(22) Filed: Apr. 30, 2008

(65) Prior Publication Data
US 2009/0028580 A1    Jan. 29, 2009

(30) Foreign Application Priority Data
Jul. 24, 2007    (JP) .............. 2007-192460

(51) Int. Cl.
*G02B 6/28* (2006.01)
(52) U.S. Cl. .......................... 385/24; 385/15
(58) Field of Classification Search ............... 385/15, 385/24
See application file for complete search history.

(56) References Cited

U.S. PATENT DOCUMENTS

| 5,359,412 | A  | 10/1994 | Schulz |
|---|---|---|---|
| 7,623,796 | B2 * | 11/2009 | Liu .................. 398/202 |
| 2004/0141222 | A1 | 7/2004 | Miyazaki et al. |
| 2005/0047780 | A1 | 3/2005 | Hoshida et al. |
| 2006/0056845 | A1 | 3/2006 | Parsons et al. |
| 2008/0166126 | A1 | 7/2008 | Ohm et al. |
| 2008/0199189 | A1 * | 8/2008 | Xu et al. .................. 398/188 |

FOREIGN PATENT DOCUMENTS

| JP | 2005-080304 | 3/2005 |
|---|---|---|
| JP | 2007-020138 | 1/2007 |
| WO | 03/063515 | 7/2003 |
| WO | 2005/107107 | 11/2005 |
| WO | 2007/007864 | 1/2007 |

OTHER PUBLICATIONS

Extended European Search Report issued Oct. 23, 2008 in corresponding European Application No. 08008177.1.

* cited by examiner

*Primary Examiner*—Jennifer Doan
(74) *Attorney, Agent, or Firm*—Staas & Halsey LLP

(57) ABSTRACT

The optical reception apparatus of the invention branches into two an RZ-DQPSK optical signal input from an optical transmission path via an optical amplifier, respectively sends this to delay interferometers and photoelectric converters on a pair of arms, separately detects a number of generated errors for the signals propagating through the arms in an error-number detection circuit, obtains a difference in the respective number of generated errors in an error-number detector, and controls phase shift in the delay interferometers so that the difference is within a preset tolerance. By so doing, it is possible to realize excellent reception performance by suppressing the occurrence of the burst error.

9 Claims, 9 Drawing Sheets

CONFIGURATION EXAMPLE OF 40-Gbps OPTICAL TRANSMISSION SYSTEM

TRANSMISSION UNIT IN RZ-DQPSK MODULE

RECEPTION UNIT IN RZ-DQPSK MODULE

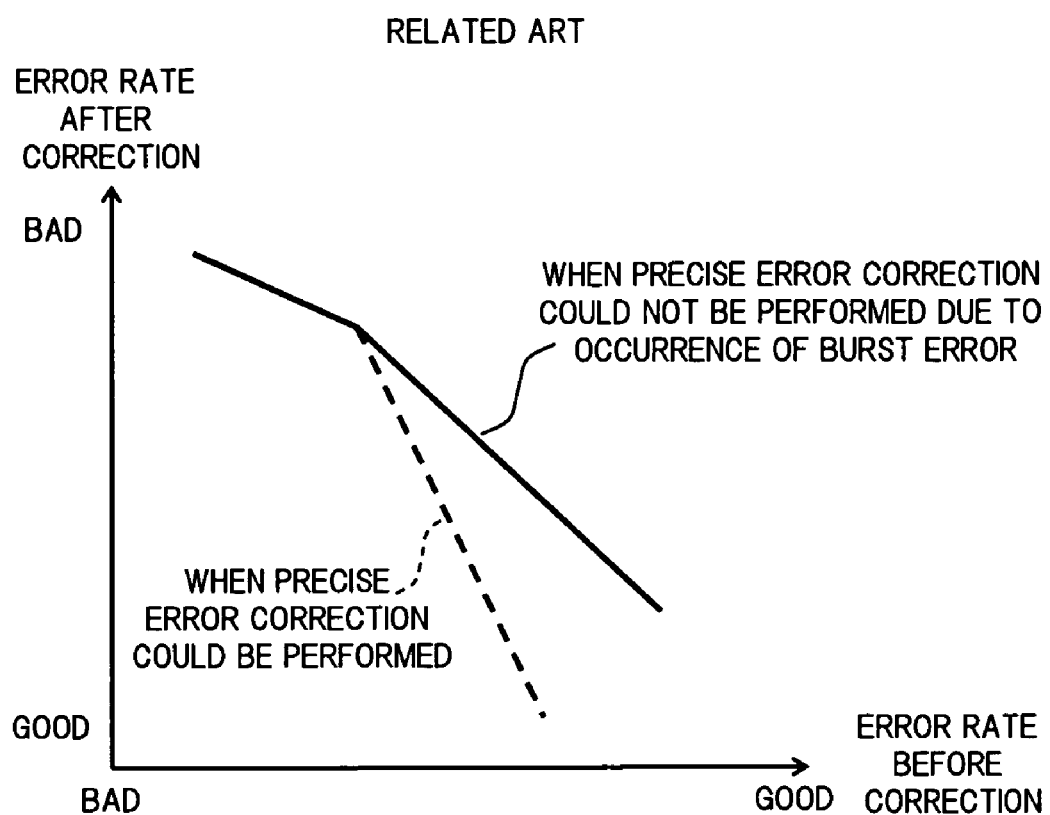

OPTICAL RECEPTION APPARATUS AND CONTROLLING METHOD THEREOF

BACKGROUND OF THE INVENTION

1. Field of the Invention

The present invention relates to an optical reception apparatus that receives an optical signal of a multivalue phase modulating format used for an optical transmission system, and a controlling method thereof.

2. Description of the Related Art

Recently, a need for introduction of an optical transmission system corresponding to next-generation 40 gigabit per second (Gbps) is increasing, while transmission distance and frequency availability equivalent to those of an existing 10 Gbps system are required. As a means for realizing this, for example, there has been developed an optical transmission system that applies a multivalue phase modulating format such as Return to Zero-Differential Quadrature Phase Shift Keying (RZ-DQPSK) having excellent Optical Signal Noise Ratio (OSNR) tolerance and nonlinearity tolerance as compared with a Non Return to Zero (NRZ) modulating format, which has been applied in a conventional system corresponding to 10 Gbps or less. Moreover, in addition to the application of the above multivalue phase modulating format, there has been also adopted a technique for improving performance such as long distance transmission and high noise tolerance by performing error correction in an electric stage after an optical signal having an error due to transmission deterioration is photoelectrically converted according to a conventional error correction method by Reed-Solomon code or a new error correction coding method.

FIG. 6 is a diagram showing a configuration example of a known 40 Gbps optical transmission system. In this optical transmission system, a plurality of base stations 110 are connected to each other via an optical transmission line 100, and each base station 110 includes a 40 Gbps router 111 connected with a client (not shown), and an optical transmission device 112 connected to the optical transmission line 100. Between the router 111 and the optical transmission device 112 in each base station 110, a 40 Gbps optical signal having a relatively wide optical spectrum width is transmitted in both directions. Moreover, between the optical transmission devices 112 in opposite base stations 110, a 43 Gbps optical signal having a narrow optical spectrum width with an error correction code is transmitted for a long distance in both directions.

FIG. 7 is a diagram showing a configuration example of the optical transmission device 112 in FIG. 6. In this configuration example, a known framing process by a framer LSI 122 and an error correction code-adding process are executed with respect to the signal that has been photoelectrically converted by a 40 Gbps broadband module 121 that transmits and receives the optical signal to and from the router 111 on the client side. Moreover, a narrow-band optical signal for long distance transmission generated by a 43 Gbps RZ-DQPSK module 123 that performs RZ-DQPSK modulation processing according to the signal processed by the framer LSI 122, is amplified to a required level by an optical amplifier 124 and then transmitted to the optical transmission line 100. The narrow-band optical signal propagated through the optical transmission line 100 and received by the optical transmission device 112 is amplified to the required level by the optical amplifier 124, and is then input to the 43 Gbps RZ-DQPSK module 123 and demodulated, and the error correction process of the received signal is performed by the framer LSI 122. A broadband optical signal generated by the 40 Gbps broadband module 121 according to the signal processed by the framer LSI 122 is output to the router 111 on the client side.

FIG. 8 is a diagram showing a configuration example of a transmission unit in the RZ-DQPSK module 123 in FIG. 7. In the transmission unit, a continuous wave (CW) output from a light source 131 is provided to a phase modulator 132 and an intensity modulator 133, and the phase modulator 132 and the intensity modulator 133 are driven based on an electric signal output from the framer LSI 122, to thereby output an optical signal of an RZ-DQPSK modulating format. Specifically, parallel electric signals output from the framer LSI 122 are subjected to serial signal processing by a serializer 134, and then separated into two flows of data signals $D_A$ and $D_B$ in a separation circuit 135. By driving the phase modulator 132 by a drive signal generated by driving circuits 136A and 136B according to the respective data signals $D_A$ and $D_B$, a DQPSK modulated optical signal is output from the phase modulator 132. Moreover, a clock signal CLK having a frequency corresponding to the data signals $D_A$ and $D_B$ is output from the serializer 134, and the intensity modulator 133 is driven by a drive signal generated by a driving circuit 137 according to the clock signal CLK, to thereby output the RZ-DQPSK modulated optical signal from the intensity modulator 133.

FIG. 9 is a diagram showing a configuration example of a reception unit in the RZ-DQPSK module 123 in FIG. 7. In the reception unit, the RZ-DQPSK optical signal received from the optical transmission line 100 via the optical amplifier 124 is branched into two, and respectively transmitted to an arm A where a delay interferometer 141A is formed and an arm B where a delay interferometer 141B is formed. The delay interferometer 141A makes a 1-bit time delay component and a $\pi/4$ rad phase-controlled component interfere with each other (delay interference), and outputs the interference result as two outputs. Moreover, the delay interferometer 141B makes a 1-bit time delay component and a $-\pi/4$ rad phase-controlled component (the phase is shifted from that of the component in the delay interferometer 141A by $\pi/2$ rad) interfere with each other (delay interference), and outputs the interference result as two outputs. Output beams from the respective delay interferometers 141A and 141B are received by photoelectric conversion circuits 142A and 142B having a pair of a photodiode and an amplifier, to thereby perform differential photoelectric conversion detection. Then, after output signals from the photoelectric conversion circuits 142A and 142B are provided to a multiplex circuit 143 and multiplexed, the multiplexed signals are provided to a deserializer 144 and subjected to parallel signal processing, and signal-processed signals are transmitted to the framer LSI 122 in the subsequent stage. Moreover, the output signals from the photoelectric conversion circuits 142A and 142B are also respectively provided to mixers 145A and 145B, and phase shift amounts in the respective delay interferometers 141A and 141B are controlled by control circuits 146A and 146B, respectively, so that an opening of an eye pattern in an output waveform of the respective mixers 145A and 145B becomes an optimum state.

As a technique associated with the optical reception apparatus corresponding to the reception unit shown in FIG. 9, for example, Japanese Unexamined Patent Publication No. 2005-80304 is known. In Japanese Unexamined Patent Publication No. 2005-80304, it is proposed, as one method for adjusting a relative delay in the delay interferometer, to monitor a bit error rate (BER) of the signal based on an interference signal generated by the delay interferometer, and adjust the relative delay based on the BER.

However, in the conventional technique for receiving the multivalue phase modulated optical signal such as the above RZ-DQPSK optical signal, there is a problem in that it becomes difficult to perform the error correction precisely by the framer LSI 122 in the subsequent stage, due to a burst error occurring in the reception unit in the RZ-DQPSK module 123.

In other words, the optical signal received by the reception unit in the RZ-DQPSK module 123 is amplified by the optical amplifier 124 (FIG. 7) for compensating a loss caused by the long distance transmission. Therefore, amplified spontaneous emission (ASE) occurring in the optical amplifier 124 is added as broadband optical noise. In the RZ-DQPSK signal added with the optical noise, for example, as shown in a conceptual diagram of FIG. 10, noise is carried on a light emission side corresponding to level "1", and hence, the signal waveform largely collapses.

As in the configuration example shown in FIG. 9, when the mixers 145A and 145B are used to control the phase shift amount in the delay interferometers 141A and 141B, the control largely depends on the signal waveform, and there is an influence of manufacturing variations of the delay interferometers 141A and 141B. Therefore, the relative delay added to between the optical signals propagating through the arms A and B is not in an optimum state. Accordingly, for example, as shown in a conceptual diagram of FIG. 11, an error rate of the signal before error correction corresponding to the optical signal on the arm A side and an error rate of the signal before error correction corresponding to the optical signal on the arm B side are largely different from each other. The broken line in FIG. 11 indicates an error rate (ideal value) when the relative delay is controlled in the optimum state, and the error rates on the arm A side and on the arm B side agree with each other.

Since the error rates on the arm A side and on the arm B side are different, a burst error in which frequent errors arise intermittently, occurs in the signal multiplexed in the multiplex circuit 143 (FIG. 9). In a general error correction method it is difficult to handle such a burst error, and as a result, for example, as shown by the solid line in FIG. 12, error correction cannot be performed precisely by the framer LSI 122 in the subsequent stage, thereby causing degradation of reception performance.

SUMMARY

The present invention addresses the above points, with an object of providing an optical reception apparatus corresponding to the multivalue phase modulating format that can realize excellent reception performance by suppressing the occurrence of the burst error, and a controlling method thereof.

In order to achieve the above object, the optical reception apparatus of one aspect of an embodiment comprises: a branching unit that branches an input optical signal of a multivalue phase modulating format into two; a first route through which one of the optical signals branched by the branching unit propagates; a second route through which the other of the optical signals branched by the branching unit propagates; a first delay interferometer arranged on the first route; a second delay interferometer arranged on the second route; a first photoelectric converter that receives an optical signal output from the first delay interferometer and converts it into an electric signal; a second photoelectric converter that receives an optical signal output from the second delay interferometer and converts it into an electric signal; a multiplexer that multiplexes a signal output from the first photoelectric converter and a signal output from the second photoelectric converter; and an error correction unit that performs error correction processing for a signal output from the multiplexer, wherein the optical reception apparatus further comprises: an error-number detector that detects a number of generated errors in a signal propagating on the first route side and also detects a number of generated errors in a signal propagating on the second route side; an error-number comparator that obtains a difference in a number of generated errors on the first and second route sides detected by the error-number detector; and a controller that controls at least one of the first and second delay interferometers and the first and second photoelectric converters so that the difference in the number of generated errors obtained by the error-number comparator is within a preset tolerance.

In the optical reception apparatus having the above configuration, the number of generated errors in the signal propagating in the first route and the number of generated errors in the signal propagating in the second route are independently detected, and control of the devices on the first route and the second route is performed so that the difference in the number of generations of errors is within the tolerance. As a result, unbalance in the error occurrence state between the first route and the second route is reduced, and the occurrence of the burst error is suppressed.

Therefore according to the optical reception apparatus of one aspect of an embodiment, since error correction can be performed precisely by the error correction unit with respect to the signal multiplexed by the multiplexer, reception characteristics of an optical signal of a multivalue phase modulating format can be improved. By applying such an optical reception apparatus to construct the optical transmission system, a super high-speed optical signal, for example, a 40 Gbps optical signal, can be transmitted for a long distance, while realizing high noise tolerance.

Other objects, features, and advantages of the present invention will become apparent from the following description of the embodiments in conjunction with the appended drawings.

BRIEF DESCRIPTION OF THE DRAWING

FIG. 12 is a diagram showing deterioration in an error rate due to an occurrence of a burst error.

DETAILED DESCRIPTION OF THE INVENTION

Hereunder is a description of a best mode for carrying out the present invention, with reference to the accompanying drawings. Throughout the figures, the same reference symbols denote the same or corresponding parts.

Figure 1:
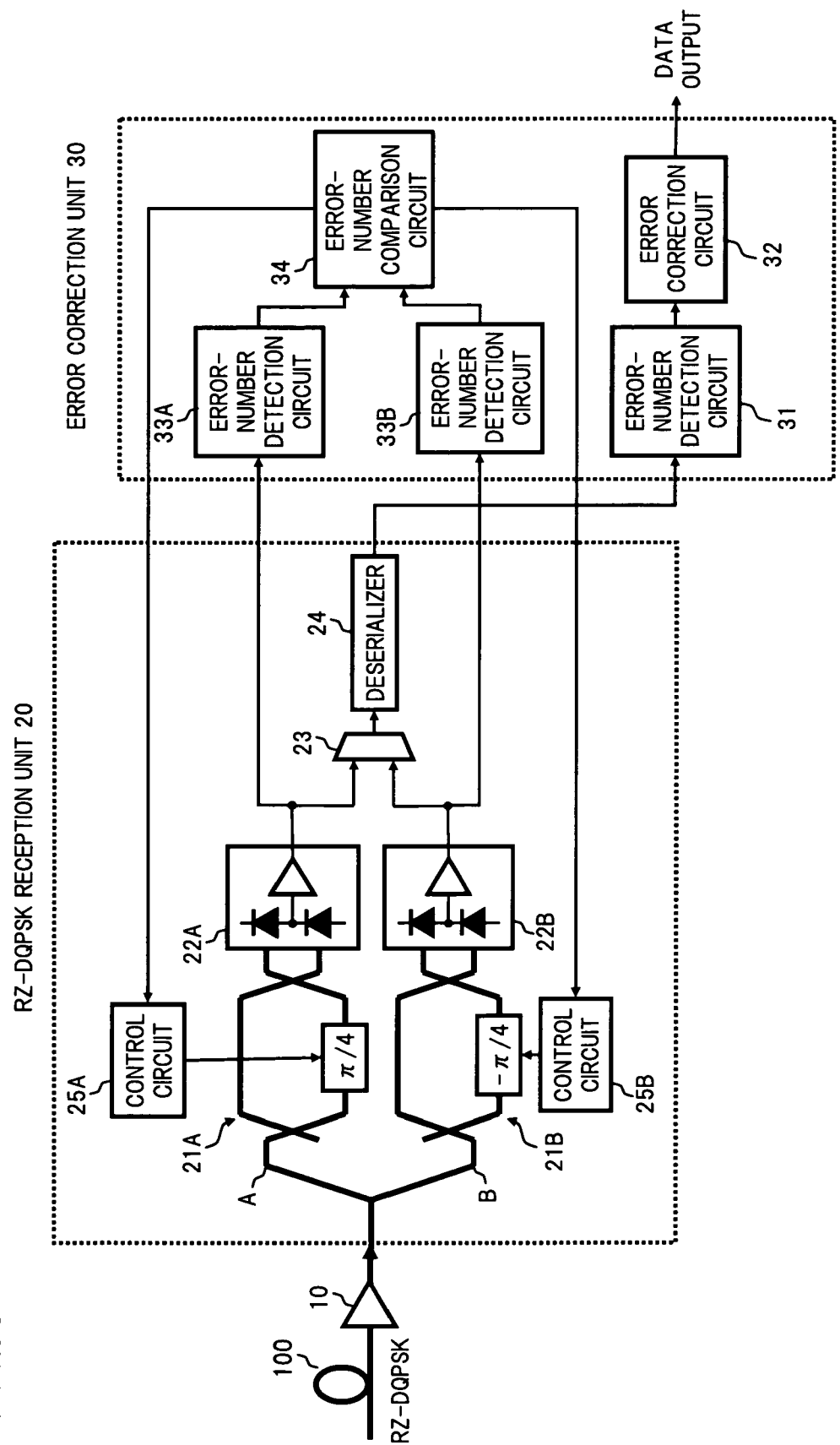
FIG. 1 is a block diagram showing a configuration of an optical reception apparatus according to a first embodiment.

FIG. 1 is a block diagram showing a configuration of an optical reception apparatus according to a first embodiment.

In FIG. 1, the optical reception apparatus in the first embodiment includes for example: an optical amplifier 10 to which an optical signal of an RZ-DQPSK modulating format transmitted through an optical transmission line 100 is input, which amplifies the optical signal to a required level; an RZ-DQPSK reception unit 20 that receives and processes the RZ-DQPSK optical signal output from the optical amplifier 10; and an error correction unit 30 that performs error correction processing of a reception signal output from the RZ-DQPSK reception unit 20.

The RZ-DQPSK reception unit 20 branches the RZ-DQPSK optical signal received via the optical amplifier 10 into two, and transmits one of the branched optical signals to an arm A serving as a first route, and the other optical signal to an arm B serving as a second route. Delay interferometers 21A and 21B are respectively provided on the arms A and B. The delay interferometer 21A makes a 1-bit time delay component and a $\pi/4$ rad phase-controlled component interfere with each other (delay interference), and outputs the interference result as two outputs. Moreover the delay interferometer 21B makes a 1-bit time delay component and a $-\pi/4$ rad phase-controlled component (the phase is shifted from that of the same component in the delay interferometer 21A by $\pi/2$ rad) interfere with each other (delay interference), and outputs the interference result as two outputs. Here, the delay interferometers 21A and 21B are formed by a Mach-Zehnder interferometer, respectively, and respective Mach-Zehnder interferometers are formed so that one arm becomes longer than the other arm by a propagation length corresponding to 1-bit time, and an electrode for phase-shifting the optical signal propagating through the other arm is formed therein. A bias voltage for phase shift to be applied to the electrodes in respective delay interferometers 21A and 21B is controlled by control circuits 25A and 25B.

Output beams from the respective delay interferometers 21A and 21B are respectively input to photoelectric conversion circuits 22A and 22B serving as first and the second photoelectric converters. The respective photoelectric conversion circuits 22A and 22B have, for example, a pair of a photodiode and an amplifier, and receive the output beams from the corresponding delay interferometer 21A or 21B, to perform differential photoelectric conversion detection. The output signals from the photoelectric conversion circuits 22A and 22B are transmitted to a multiplex circuit 23, and a part of the respective output signals is also transmitted to the error correction unit 30. The multiplex circuit 23 multiplexes the output signals from the photoelectric conversion circuits 22A and 22B and outputs a multiplexed signal to a deserializer 24. The deserializer 24 performs parallel signal processing of the output signal from the multiplex circuit 23.

The error correction unit 30 includes for example; an error correction circuit 32, to which the output signal from the deserializer 24 is input via an error-number detection circuit 31, an error-number detection circuit 33A to which an output signal from the photoelectric conversion circuit 22A on the arm A side is input, an error-number detection circuit 33B to which an output signal from the photoelectric conversion circuit 22B on the arm B side is input, and an error-number comparison circuit 34 for comparing the number of generations of errors detected by the respective error-number detection circuits 33A and 33B and obtaining the difference therebetween.

The respective error-number detection circuits 31, 33A, and 33B are circuits that count the number of generated errors in the signals respectively input thereto, based on an error correction code attached to the received optical signal. The error correction circuit 32 is a known circuit for performing error correction processing with respect to the reception signal that has passed through the error-number detection circuit 31. The error-number comparison circuit 34 obtains the difference in the number of generations of errors detected by the error-number detection circuits 33A and 33B corresponding to the respective arms A and B, generates information required for feed-back controlling the respective delay interferometers 21A and 21B in the RZ-DQPSK reception unit 20 so that the difference in the number of generations of errors decreases (ideally, the difference in the numbers of errors becomes zero), and transmits the generated information to the respective control circuits 25A and 25B. The control circuits 25A and 25B having received the information from the error-number comparison circuit 34 control, for example, the bias voltage applied to the electrode for phase shift, to thereby reduce the unbalance in the error occurrence state between the respective arms A and B.

Here the error-number comparison circuit 34 calculates the number of generated errors per unit time based on the number of generations of errors detected by the error-number detection circuits 33A and 33B, and calculates a difference in these numbers of generations of errors.

Figure 7:
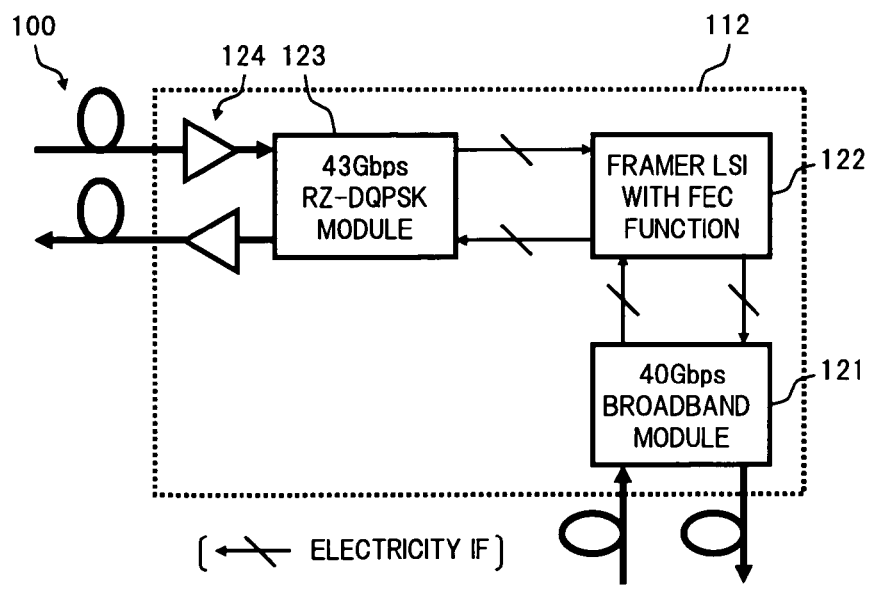
FIG. 7 is a diagram showing a configuration example of an optical transmission device in FIG. 6.
Figure 8:
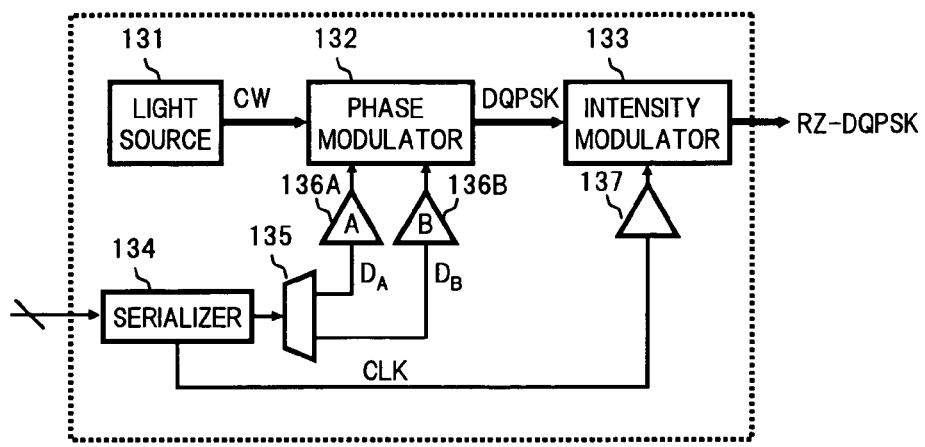
FIG. 8 is a diagram showing a configuration example of a transmission unit in an RZ-DQPSK module in FIG. 7.
Figure 9:
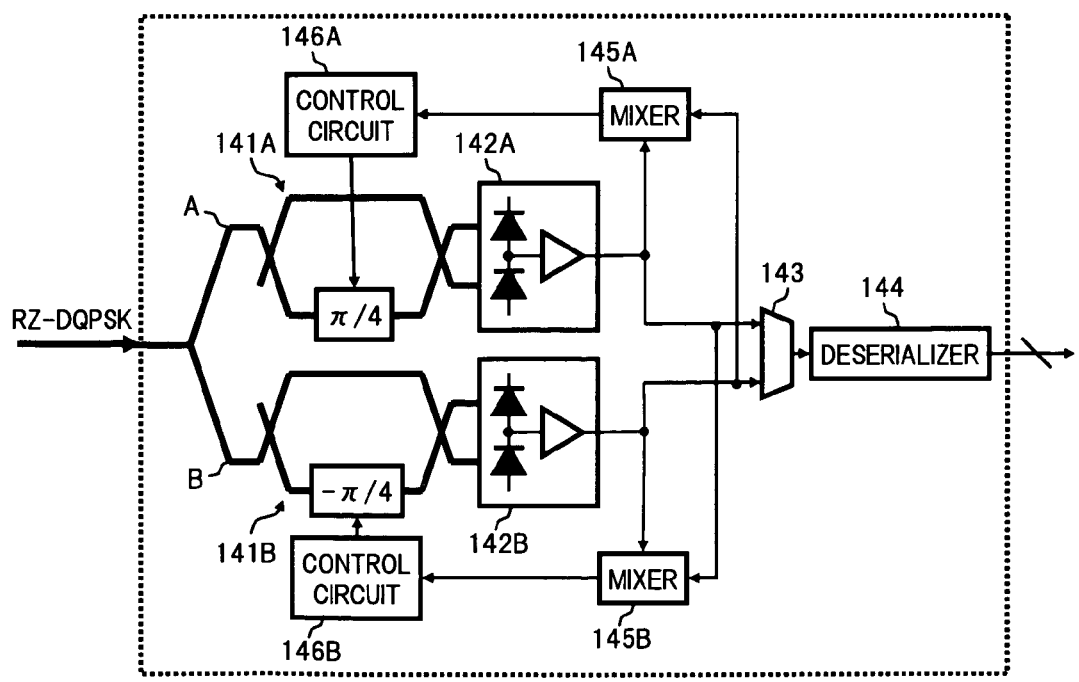
FIG. 9 is a diagram showing a configuration example of a reception unit in the RZ-DQPSK module in FIG. 7.
Figure 10:
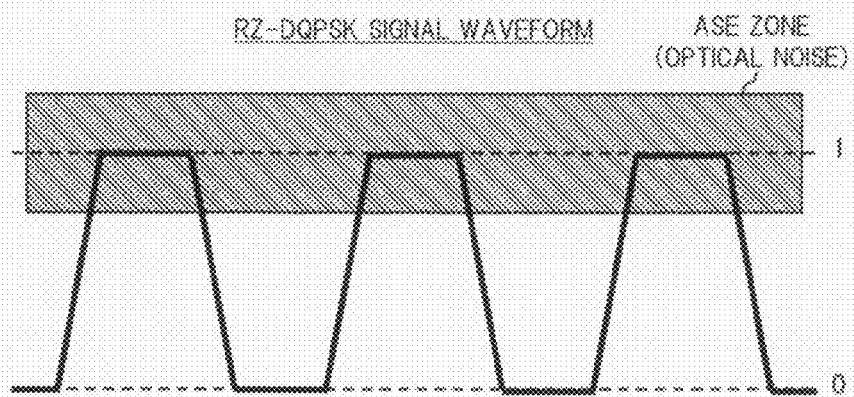
FIG. 10 is a conceptual diagram of an optical signal waveform input to the reception unit in FIG. 9.
Figure 11:
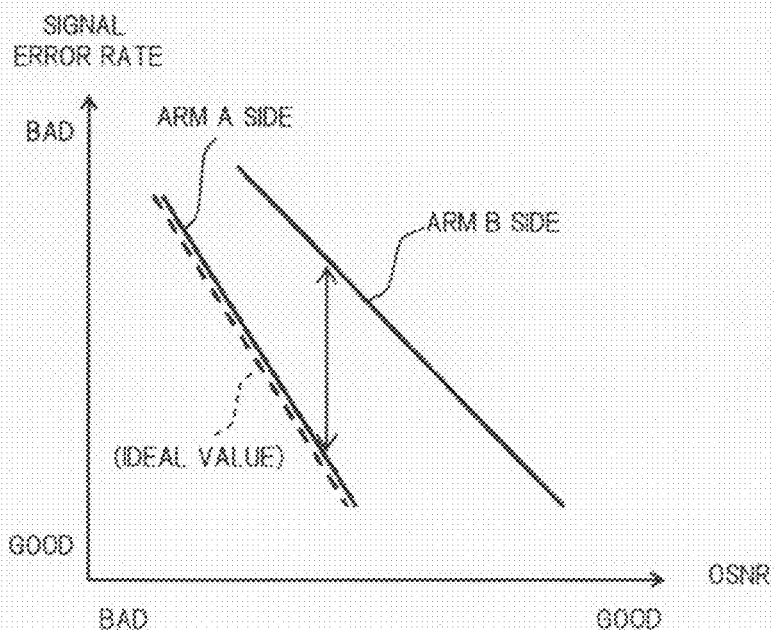
FIG. 11 is a conceptual diagram of an error rate of an optical signal corresponding to each arm in the reception unit in FIG. 9.

The function realized by the error-number detection circuit 31 and the error correction circuit 32 is the same as an FEC function of the aforementioned framer LSI used in the conventional beam transmission device shown in FIG. 7. On the other hand, the function realized by the error-number detection circuits 33A and 33B and the error-number comparison circuit 34 is not included in the conventional framer LSI with the FEC function, and is a function newly added in the first embodiment. The function can be incorporated by changing the design of the conventional framer LSI.

Figure 2:
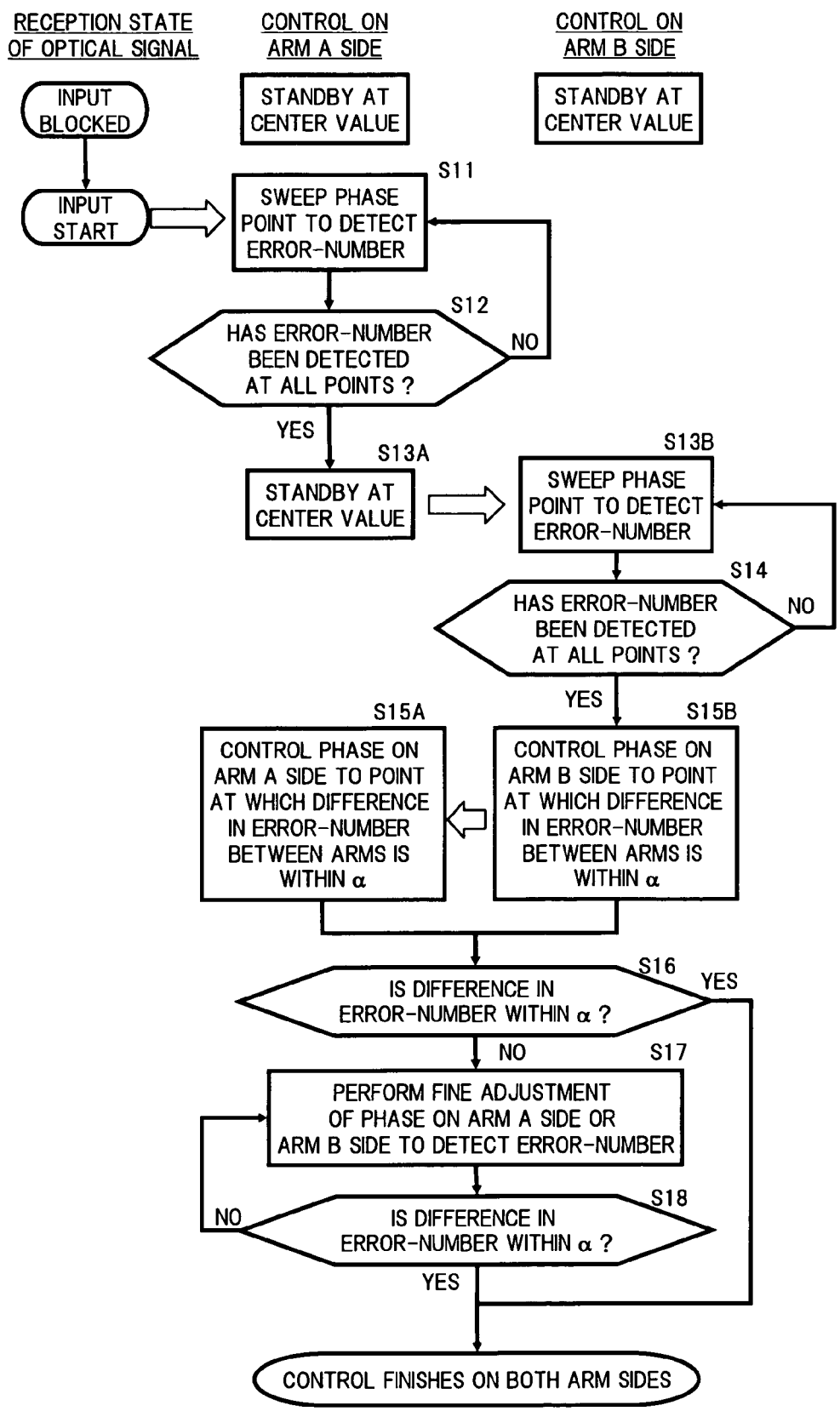
FIG. 2 is a flowchart for explaining an operation in the first embodiment.

Next is a description of an operation in the first embodiment, with reference to the flowchart in FIG. 2.

In the optical reception apparatus having the above configuration, at first in an input-blocked reception state in which the optical signal is not transmitted from the optical transmission line 100 to the optical amplifier 10, the delay interferometers 21A and 21B corresponding to the respective arms A and B in the RZ-DQPSK reception unit 20 are controlled to a standby state waiting for an input of the optical signal, by setting the respective bias voltages for phase shift to a center value of a variable range.

Then, the RZ-DQPSK optical signal that has propagated through the optical transmission line 100 is input to the optical amplifier 10. When the optical signal amplified by the optical amplifier 10 (including ASE noise) is branched into two by the RZ-DQPSK reception unit 20 and input to the delay interferometers 21A and 21B on the respective arms A and B, then in step 11 in FIG. 2 (shown by S11 in the figure, and similarly hereunder), the bias voltage for phase shift is swept in the variable range with respect to the delay interferometer 21A on the arm A side, to detect the number of generated errors in the signal on the arm A side at a plurality of preset phase points by the error-number detection circuit 33A, and the detection result is recorded in the error-number comparison circuit 34. Then in step 12, it is determined whether detection of the number of generated errors has been completed for all the phase points on the arm A side. When completion is confirmed, control proceeds to steps 13A and 13B.

At this time, detection of the number of generated errors at a certain phase point is complete, for example, with the lapse of predetermined time determined beforehand, and the bias voltage for phase shift is controlled so as to proceed to the next phase point.

In step 13A, the bias voltage for phase shift on the arm A side is set to the center value to return the delay interferometer 21A to the standby state. Then in step 13B, the bias voltage for phase shift is swept in the variable range with respect to the delay interferometer 21B on the arm B side, to detect the number of generated errors in the signal on the arm B side at a plurality of preset phase points by the error-number detection circuit 33B, and the detection result is recorded in the error-number comparison circuit 34. Then in step 14, it is determined whether detection of the number of generated errors has been completed for all the phase points on the arm B side. When completion is confirmed, control proceeds to steps 15A and 15B.

In steps 15A and 15B, in the error-number comparison circuit 34, the respective numbers of generations of errors on the arm A side and the arm B side detected in steps 11 and 14, are compared to determine phase points corresponding to the respective arms A and B, at which the difference in the number of generated errors between the arms A and B is within a preset tolerance α. Information of the phase points is transmitted to the respective control circuits 25A and 25B.

Here, there could be a plurality of pairs of phase points corresponding to the respective arms A and B where the difference in the number of generated errors is within α. In such a case, for example, a pair of phase points having the smallest difference in the number of generated errors can be designated as a determination result, or a pair of phase points having the smallest difference in the number of generated errors at a phase point corresponding to the arm A can be designated as the determination result.

Next, in the respective control circuits 25A and 25B, the bias voltage for phase shift to be applied to the respective delay interferometers 21A and 21B is adjusted in accordance with the information from the error-number comparison circuit 34. Then the number of generated errors in the signals on the respective arm A and B sides at the phase points after adjustment is respectively detected by the error-number detection circuits 33A and 33B, and respective detection results are transmitted to the error-number comparison circuit 34.

In step 16, in the error-number comparison circuit 34, the respective numbers of generations of errors on the arm A side and the arm B side, detected in steps 15A and 15B, are compared to determine whether the difference in the number of generated errors between the arms A and B is within the tolerance α. When the difference is within the tolerance α, control of the delay interferometers 21A and 21B finishes. On the other hand, if the difference in the number of generated errors becomes larger than the tolerance α due to an influence of thermal interference or the like between the arms A and B, control proceeds to step 17.

In step 17, the bias voltage for phase shift on the arm A side or the arm B side is finely adjusted, and the number of generated errors corresponding to each arm A and B after the fine adjustment is detected again by the error-number detection circuits 33A and 33B. Then in step 18, the respective numbers of generations of errors on the arms A and B detected in step 17 are compared in the error-number comparison circuit 34, and the fine adjustment in step 17 is repeated until the difference in the number of generated errors between the arms A and B becomes within the tolerance α.

The number of generated errors in the signal corresponding to each arm A and B is individually detected in the above manner, and the phase shift amount in the delay interferometers 21A and 21B is feed-back controlled so that the difference in the number of generated errors between the arms A and B becomes within the tolerance, based on the respective detection results. By so doing, even if the broadband ASE noise is added to the optical signal by the optical amplifier 10 in an input stage, occurrence of the burst error can be effectively suppressed. Accordingly, the reception signal output from the photoelectric conversion circuits 22A and 22B corresponding to the respective arms A and B, then multiplexed by the multiplex circuit 23, and further subjected to the parallel signal processing by the deserializer 24 can be corrected by the error correction circuit 32 precisely, thereby enabling improvement in the reception characteristics of the RZ-DQPSK optical signal. If the configuration of such an optical reception apparatus is applied to the reception unit of the RZ-DQPSK module and the FEC function of the framer LSI shown in FIG. 7, an optical transmission system corresponding to the next generation 40 Gbps, capable of long-distance transmission, and having high noise tolerance can be realized.

Next is a description of a second embodiment.

Figure 3:
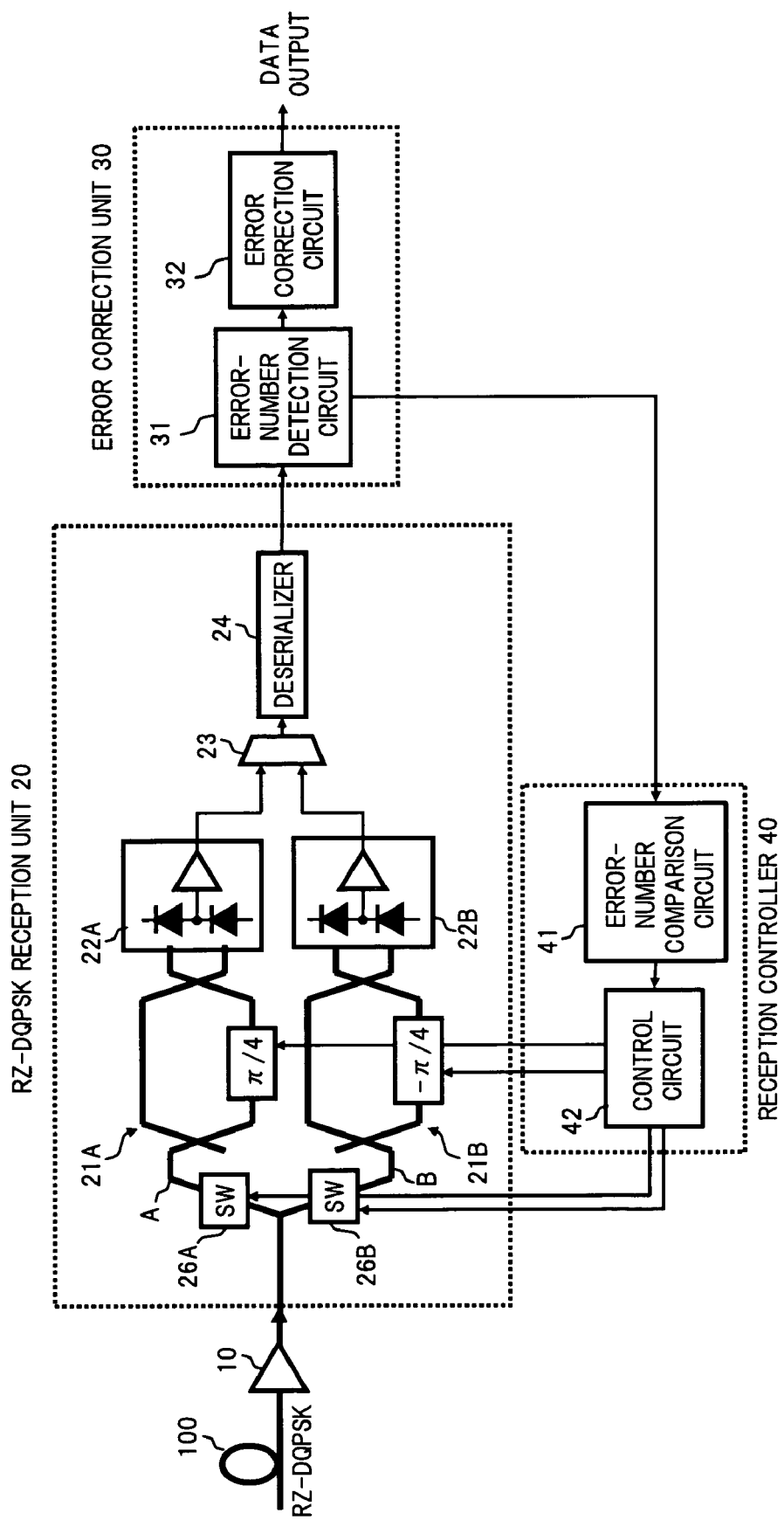
FIG. 3 is a block diagram showing a configuration of an optical reception apparatus according to a second embodiment.

FIG. 3 is a block diagram showing a configuration of an optical reception apparatus according to the second embodiment.

In FIG. 3, the optical reception apparatus according to this embodiment is an application example for simplifying the configuration of the error correction unit 30 in the configuration of the first embodiment shown in FIG. 1, by having a configuration where optical switches (SW) 26A and 26B are respectively arranged on the arms A and B of the RZ-DQPSK reception unit 20 as a signal blocking unit, so that the optical signal output from the optical amplifier 10 can be selectively input to either one of the delay interferometers 21A and 21B. Here, the error correction unit 30 is formed from the error-number detection circuit 31 and the error correction circuit 32, and a reception controller 40 is separately provided as a configuration for performing the feed-back control of the delay interferometers 21A and 21B based on the error-number detected by the error-number detection circuit 31. The function of the error correction unit 30 is the same as the FEC function of the framer LSI used in the conventional beam transmission device shown in FIG. 7.

The reception controller 40 has, for example, an error-number comparison circuit 41 and a control circuit 42. The error-number comparison circuit 41 has the same function as that of the error-number comparison circuit 34 in the first embodiment. The control circuit 42 controls ON/OFF of the optical switches 26A and 26B in the RZ-DQPSK reception unit 20 according to a signal output from the error-number comparison circuit 41, and controls the bias voltage for phase shift applied to the delay interferometers 21A and 21B.

Figure 4:
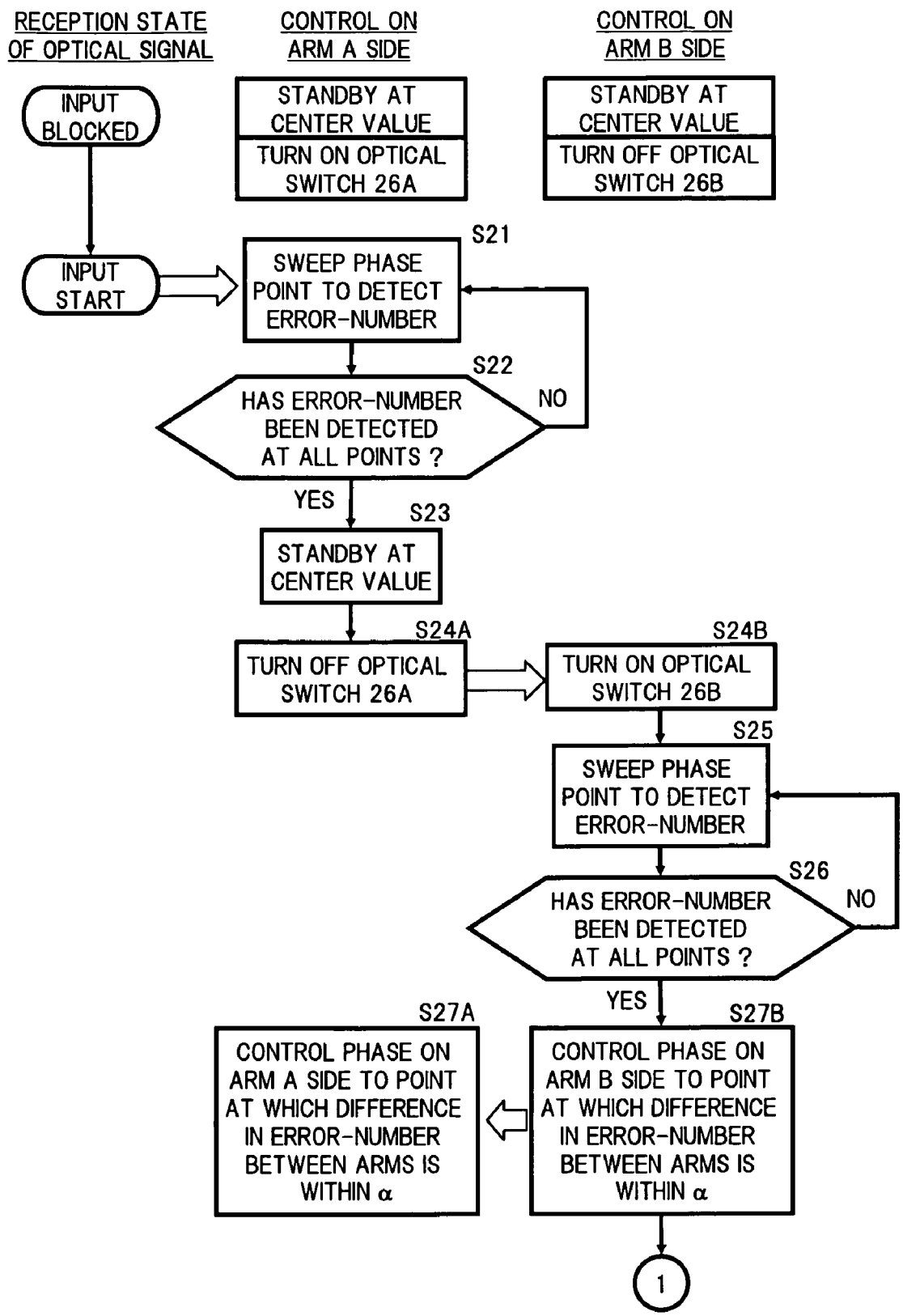
FIG. 4 is a flowchart (1) for explaining the operation in the second embodiment.
Figure 5:
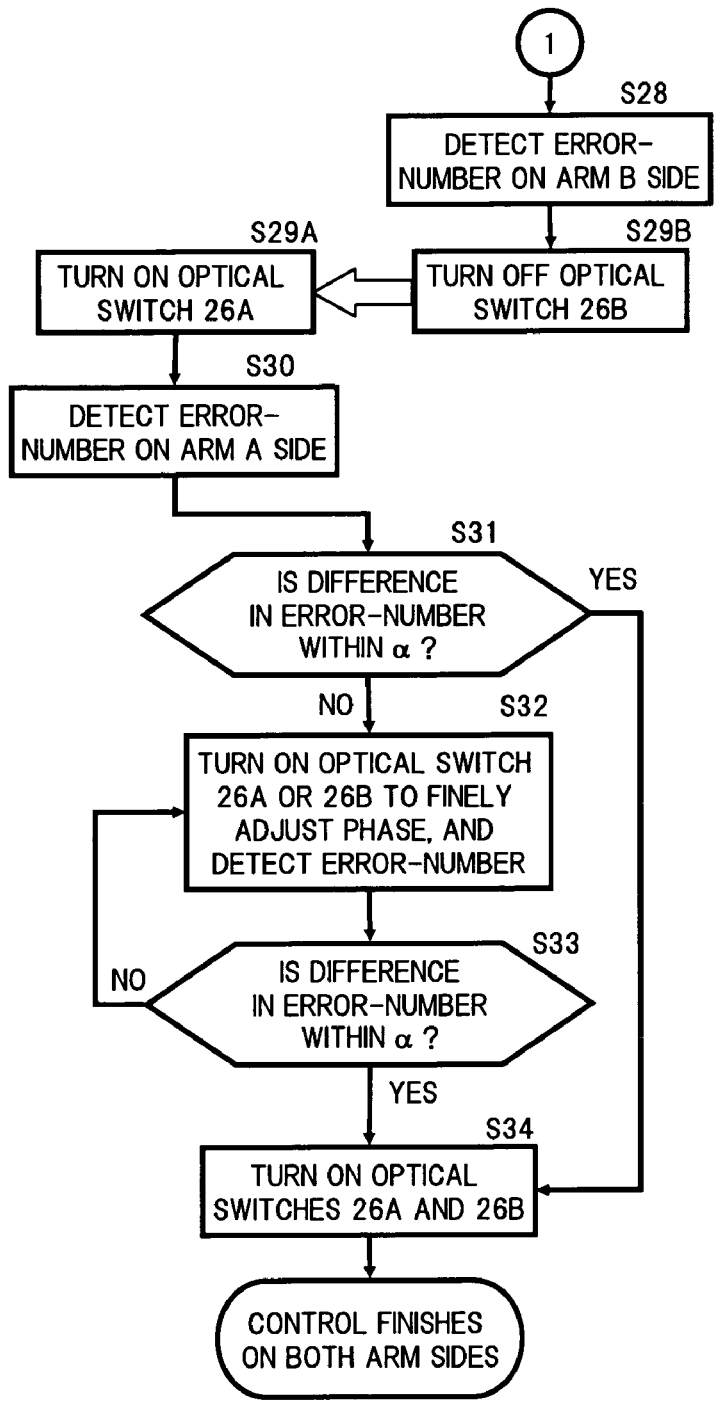
FIG. 5 is a flowchart (2) for explaining the operation in the second embodiment.
Figure 6:
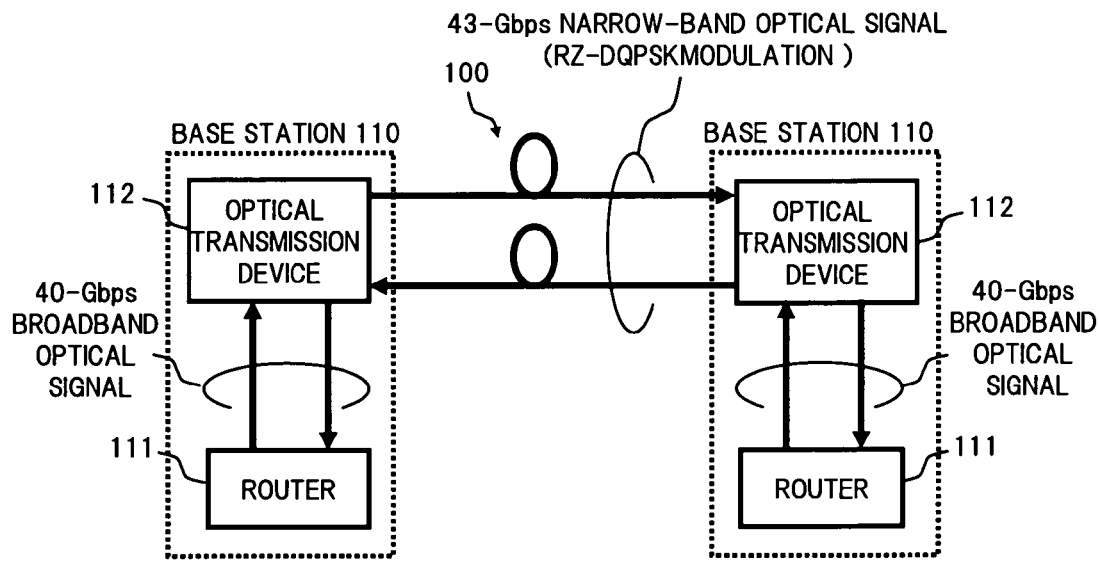
FIG. 6 is a diagram showing a configuration example of a known 40 Gbps optical transmission system.

Next is a description of an operation of the second embodiment, with reference to the flowchart in FIG. 4 and FIG. 5.

In the optical reception apparatus having the above configuration, at first in the input-blocked reception state in which the optical signal is not transmitted from the optical transmission line 100 to the optical amplifier 10, the delay interferometers 21A and 21B corresponding to the respective arms A and B in the RZ-DQPSK reception unit 20 are controlled to the standby state waiting for an input of the optical signal, by setting the respective bias voltages for phase shift to a center value of the variable range, and here turning on the optical switch 26A on the arm A side and turning off the optical switch 26B on the arm B side.

Then, the RZ-DQPSK optical signal having propagated through the optical transmission line 100 is input to the optical amplifier 10. The optical signal amplified by the optical amplifier 10 (including ASE noise) is branched into two by the RZ-DQPSK reception unit 20, and while the optical signal transmitted to the arm A side passes through the optical switch 26A in the on state and is input to the delay interferometer 21A, the optical signal transmitted to the arm B side is blocked by the optical switch 26B in the off state. Then, in step 21 in FIG. 4, the bias voltage for phase shift is swept in the variable range by the control circuit 42 with respect to the delay interferometer 21A on the arm A side, to detect the number of generated errors in the signal on the arm A side at a plurality of preset phase points by the error-number detection circuit 31, and the detection result is recorded in the error-number comparison circuit 41. Then in step 22, it is determined whether detection of the number of generated errors has been completed for all the phase points on the arm A side. When completion is confirmed, control proceeds to step 23, where the control circuit 42 sets the bias voltage for phase shift on the arm A side to a center value. Then in step 24A, the optical switch 26A on the arm A side is switched from ON to OFF, and in step 24B, the optical switch 26B on the arm B side is switched from OFF to ON.

In step 25, the bias voltage for phase shift is swept in the variable range with respect to the delay interferometer 21B on the arm B side, to detect the number of generated errors in the signal on the arm B side at a plurality of preset phase points by the error-number detection circuit 31, and the detection result is recorded in the error-number comparison circuit 41. Then in step 26, it is determined whether detection of the number of generated errors has been completed for all the phase points on the arm B side. When completion is confirmed, control proceeds to steps 27A and 27B.

In steps 27A and 27B, in the error-number comparison circuit 41, the respective numbers of generations of errors on the arm A side and the arm B side detected in steps 21 and 25 are compared, to determine phase points corresponding to the respective arms A and B, at which the difference in the number of generated errors between the arms A and B is within the preset tolerance α. Information of the phase points is transmitted to the control circuit 42. In the control circuit 42, the bias voltage for phase shift to be applied to the respective delay interferometers 21A and 21B is adjusted in accordance with the information from the error-number comparison circuit 41.

In step 28 in FIG. 5, the number of generated errors in the signal on the arm B side at the phase points after adjustment is detected by the error-number detection circuit 31, and the detection result is transmitted to the error-number comparison circuit 41. Then in step 29B, the optical switch 26B on the arm B side is switched from ON to OFF, and in step 29A, the optical switch 26A on the arm A side is switched from OFF to ON. In step 30, the number of generated errors in the signal on the arm A side at the phase points after adjustment is detected by the error-number detection circuit 31, and the detection result is transmitted to the error-number comparison circuit 41.

In step 31, in the error-number comparison circuit 41, the respective numbers of generations of errors on the arm A side and the arm B side, detected in steps 28 and 30, are compared to determine whether the difference in the number of generated errors between the arms A and B is within the tolerance α. When the difference is within the tolerance α, control proceeds to step 34. On the other hand, if the difference in the number of generated errors becomes larger than the tolerance a due to an influence of thermal interference or the like between the arms A and B, control proceeds to step 32.

In step 32, the optical switch 26A on the arm A side or the optical switch 26B on the arm B side is turned on by the control circuit 42, to perform fine adjustment of the bias voltage for phase shift, and the number of generated errors corresponding to each arm A and B after the fine adjustment is detected again by the error-number detection circuit 31. Then in step 33, the respective numbers of generations of errors on the arms A and B detected in step 32 are compared in the error-number comparison circuit 41, and the fine adjustment in step 32 is repeated until the difference in the number of generated errors between the arms A and B becomes within the tolerance α. When the difference in the number of generated errors is within the tolerance α, then in step 34, the optical switches 26A and 26B on the respective arms A and B are turned on by the control circuit 42, to finish the control of the delay interferometers 21A and 21B.

By selectively switching the ON/OFF state of the optical switches 26A and 26B provided on the respective arms A and B in the above manner, the number of generated errors in the signal corresponding to the respective arms A and B is detected in a time-shared manner in the common error-number detection circuit 31, and even though the phase shift amount in the respective delay interferometers 21A and 21B is feed-back controlled based on the detection result, so that the difference in the number of generated errors between the arms A and B is within the tolerance, the same effect as for the aforementioned case of the first embodiment can be obtained. Moreover, the function of the error correction unit 30 in this embodiment is the same as the FEC function of the conventional framer LSI, and the existing LSI can be directly used. Therefore a lower cost optical reception apparatus can be realized.

In the second embodiment, an example is shown in which the optical switches 26A and 26B are provided, respectively, on the arms A and B, so that the optical signal is selectively input to either one of the delay interferometers 21A and 21B. However, the present invention is not limited thereto, and for example, a signal corresponding to one of the arms A and B may be guided to the error-number detection circuit 31 by selectively driving the photoelectric conversion circuits 22A and 22B by the control circuit 42. Moreover, a configuration example is shown in which the reception controller 40 is provided separately from the RZ-DQPSK reception unit 20 and the error correction unit 30. However, as in the first embodiment, the control circuit may be provided in the RZ-DQPSK reception unit 20, and the error-number detection circuit 31 may be provided in the error correction unit.

Furthermore in the first and the second embodiments, an optical reception apparatus corresponding to the RZ-DQPSK modulation method has been described. However, the present invention is not limited thereto, and the configuration of the present invention is effective for the multivalue phase modulating format in which the received optical signal is branched into a plurality of arms to perform a demodulation process, regardless of whether intensity modulation (RZ-pulsing) is performed. In addition, in the embodiments, the bias voltage for phase shift applied to the respective delay interferometers 21A and 21B is feed-back controlled according to the difference in the number of generated errors. However, for example, even if an output signal level of the respective photoelectric conversion circuits 22A and 22B is feed-back controlled according to the difference in the number of generated errors, it is possible to reduce the unbalance in the error occurrence state between the respective arms A and B.

What is claimed is:

1. An optical reception apparatus comprising:
   a branching unit that branches an input optical signal of a multivalue phase modulating format into two;
   a first route through which one of the optical signals branched by the branching unit propagates;
   a second route through which the other of the optical signals branched by the branching unit propagates;
   a first delay interferometer arranged on the first route;
   a second delay interferometer arranged on the second route;
   a first photoelectric converter that receives an optical signal output from the first delay interferometer and converts it into an electric signal;
   a second photoelectric converter that receives an optical signal output from the second delay interferometer and converts it into an electric signal;
   a multiplexer that multiplexes a signal output from the first photoelectric converter and a signal output from the second photoelectric converter; and
   an error correction unit that performs error correction processing for a signal output from the multiplexer,
   wherein the optical reception apparatus further comprises:
   an error-number detector that detects a number of generated errors in a signal propagating on the first route side and also detects a number of generated errors in a signal propagating on the second route side;
   an error-number comparator that obtains a difference in a number of generated errors on the first and second route sides detected by the error-number detector; and
   a controller that controls at least one of the first and second delay interferometers and the first and second photoelectric converters so that the difference in the number of generated errors obtained by the error-number comparator is within a preset tolerance.

2. An optical reception apparatus according to claim 1, wherein the error-number detector has a first error-number detection circuit that detects a number of generated errors in a signal output from the first photoelectric converter, and a second error-number detection circuit that detects a number of generated errors in a signal output from the second photoelectric converter.

3. An optical reception apparatus according to claim 1, comprising a signal blocking unit capable of selectively blocking either one of a signal propagating on the first route side and a signal propagating on the second route side, and
   the error-number detector detects a number of generated errors in a signal output from the multiplexer,
   the error-number comparator obtains a difference in a number of generated errors detected by the error-number detector when a signal propagating on the second route side is blocked by the signal blocking unit, and a number of generated errors detected by the error-number detector when a signal propagating on the first route side is blocked by the signal blocking unit.

4. An optical reception apparatus according to claim 3, wherein the signal blocking unit has a first optical switch arranged on the first route, a second optical switch arranged on the second route, and a control circuit for synchronously switching the first and second optical switches.

5. An optical reception apparatus according to claim 3, wherein the signal blocking unit selectively drives the first and second photoelectric converters.

6. An optical reception apparatus according to claim 1, comprising an optical amplifier that amplifies an input optical signal and outputs to the branching unit.

7. An optical reception apparatus according to claim 1, wherein the controller controls a phase shift amount in the first and second delay interferometers.

8. An optical reception apparatus according to claim 1, wherein the controller controls an output signal level of the first and second photoelectric converters.

9. A control method for an optical reception apparatus comprising:
   a branching unit that branches an input optical signal of a multivalue phase modulating format into two;
   a first route through which one of the optical signals branched by the branching unit propagates;
   a second route through which the other of the optical signals branched by the branching unit propagates;
   a first delay interferometer arranged on the first route;
   a second delay interferometer arranged on the second route;
   a first photoelectric converter that receives an optical signal output from the first delay interferometer and converts it into an electric signal;
   a second photoelectric converter that receives an optical signal output from the second delay interferometer and converts it into an electric signal;
   a multiplexer that multiplexes a signal output from the first photoelectric converter and a signal output from the second photoelectric converter; and
   an error correction unit that performs error correction processing for a signal output from the multiplexer,
   wherein the control method comprises:
   detecting a number of generated errors in a signal propagating on the first route side and also detecting a number of generated errors in a signal propagating on the second route side;
   obtaining a difference in the detected number of generated errors on the first and second route sides; and
   controlling at least one of the first and second delay interferometers and the first and second photoelectric converters so that the obtained difference in the number of generated errors is within a preset tolerance.

* * * * *